United States Patent Office 3,305,551
Patented Feb. 21, 1967

3,305,551
PREPARATION OF TRIAZINE DERIVATIVES
Lewellyn G. Picklesimer, Dayton, Ohio, and Thomas F. Saunders, Vestal, N.Y., assignors to the United States of America as represented by the Secretary of the Air Force
No Drawing. Filed Mar. 5, 1965, Ser. No. 437,608
13 Claims. (Cl. 260—248)

The invention described herein may be manufactured and used by or for the United States Government for governmental purposes without the payment to us of any royalty thereon.

This invention relates to a process for producing derivatives of triazine, substituted triazines, and the like. The substituted triazines here of interest include the mono and diamino chloro triazines, the melamines, alkoxy, and the aryloxy triazines.

In the past, several methods of preparing substituted triazines are recorded in the literature. The investigation has been extensive due to the importance of triazines in such diverse fields as medicine, dyes, explosives, polymers, and the like. Prior methods for the preparation of substituted triazines have commonly depended upon the reactions of a triazinyl halide, usually the chloride, with a compound containing a replaceable hydrogen in the presence of a base. The triazinyl halide may be reacted as an aqueous dispersion or as a solution.

An object of the present invention is to provide a new and versatile process for the preparation of substituted triazines and chloro triazines and, the preparation of triazine derivatives that are sensitive to heat and to ring openings.

In the practice of the present invention, a selected compound containing a replaceable hydrogen is dissolved in an appropriate organic solvent. A triazinyl halide is dissolved in an additional portion of the same solvent. The two solutions are carefully mixed and an acid acceptor dissolved in water is added to the solutions. The mixture is stirred and may, or may not, be heated depending upon the reactivity of the compound containing the replaceable hydrogen. The reaction vessel contains a stirrer, condenser, thermometer and, where needed, is provided with means for heating the mixture, such as by an electrical resistor winding, steam heat, or the like. At the completion of the reaction, which should be completed within an hour, the water is drained from the reaction vessel, the solvent is distilled off, and the product is isolated.

One advantage of the process is the variety of products which may be prepared. The resultant products include substituted melamines, alkyl and aryl ethers, and the like. Further advantages are mild reaction conditions, the substitution of inexpensive, inorganic bases for relatively expensive tertiatry amines and alcoholates, and the like.

Triazine derivatives which can be prepared by the processes which are disclosed herein illustratively are: 2,4,6-triphenoxy-s-triazine; 2,4,6 - tris(ethylenimino)-s-triazine; 2 - chloro-4,6-bis(N,N-diallylamino)-s-triazine; 2-chloro-4,6-bis(N-allylamino)-s-triazine; 2-chloro - 4,6 - bis(N-anilino)-s-triazine and 2,4,6-tris(2-propynoxy)-s-triazine. Suitable organic solvents that may be used in the present invention are benzene, perchlorethylene, toluene and chloroform. The restrictions on the organic solvent are that it must be inert, immiscible with water, and a suitable solvent for the triazinyl halide, and for the reacting compound.

The following laboratory confirmed examples are illustrative reductions to practice of the present invention:

Example I

In the first example the following compounds were weighed out, prepartory to being mixed together as previously described:

Cyanuric chloride _____ 9.20 gm.–0.05 mole.
Ethylenimine _____ 6.45 gm.–0.15 mole.
Sodium hydroxide _____ 6.00 gm.–0.15 mole.
Benzene _____ 200 ml.
Water _____ 20 ml.

Experimentally, the cyanuric chloride was dissolved in 100 ml. of benzene and was added to a three-necked flask fitted with a thermometer, stirrer and a reflux condenser. The flask was cooled with an ice bath and the ethylenimine in 100 ml. of benzene was added slowly to the benzene solution of cyanuric chloride with continuous stirring and with the temperature kept below 30° C. during the addition. White crystals formed during the addition of the ethylenimine-benzene solution to the cyanuric chloride solution. The 6 grams of sodium hydroxide were added to the 20 milliliters of water and, with the temperature continuously kept below 30° C., the water solution of sodium hydroxide was added with continuous stirring to the benzene solution of cyanuric chloride and ethylenimine in the three-necked flask. The flask was then removed from the ice bath and the temperature of the mixture gradually rose to 34° C. after being stirred for an additional 30 minutes.

The benzene solution was then removed by means of a separatory funnel into a container, and distilled at a pressure of 11 cm. of mercury until crystals started to form within the flask. The solution was exposed at room temperature and the benzene was permitted to evaporate. The white crystals within the flask were then dissolved in water and ample time permitted for the isolation of the small amount of by-products that were insoluble in the water. The resultant solution was then filtered for the complete removal of the insoluble by-products and the filtrate was evaporated at room temperature. The resultant product was white and its composition was determined to be 2,4,6-tris(ethylenimino)-s-triazine.

Example II

In the second example the following reactants were measured out preparatory to their being combined:

Phenol _____ 14.10 gm.–0.15 mole.
Cyanuric chloride _____ 9.20 gm.–0.05 mole.
NaOH _____ 6.00 gm.–0.15 mole.
Perchloroethylene _____ 200 ml.
Water _____ 25 ml The cyanuric chloride was dissolved in about half of the perchloroethylene and the phenol was dissolved in the other half of the perchloroethylene. These perchloroethylene solutions of phenol and cyanuric chloride were then combined as previously described in a three-necked flask, fitted with a thermometer, stirrer and a reflux condenser. The mixing of the phenol and cyanuric chloride and perchloroethylene resulted, on being stirred, in an orange-colored solution. The sodium hydroxide was dissolved in 20 ml. of water and the water solution of sodium hydroxide is added with stirring to the perchloroethylene solutions of phenol and cyanuric chloride during which the orange color of the solution disappears.

The resultant mixture was heated rapidly to 72° C. by means of a heating mantel and was continuously stirred at that temperature for about an hour.

At the end of the heating and stirring, the solution within the flask was filled with needle-like crystals. The mixture was then cooled and the crystals removed by filtration. The perchloroethylene was then allowed to evaporate or was recovered as preferred, and additional crystals were obtained during this evaporation procedure. The resultant crystals were then purified by washing with water and with acetone. The product so prepared was identified as 2,4,6-triphenoxy-s-triazine and was found to weigh 12.25 grams for a yield of 68.7% of theoretical.

*Example III*

In the third example the reactants were weighed out in the following proportions:

| | |
|---|---|
| 2-propyn-1-ol | 8.40 gm.–0.15 mole. |
| Cyanuric chloride | 9.20 gm.–0.05 mole. |
| NaOH | 6.00 gm.–0.15 mole. |
| Benzene | 200 ml. |
| Water | 25 ml. |

In the same manner in which the reactants of the previous examples were mixed, the 2-propyn-1-ol was added to 100 milliliters of the benzene and the cyanuric chloride was added to another 100 milliliters of the benzene as a separate solution and the sodium hydroxide was dissolved in the 25 milliliters of water. The 2-propyn-1-ol in benzene was poured in the three-necked flask, fitted with thermometer, stirrer and reflux condenser, and the benzene solution of cyanuric chloride was added to the flask as in the first example, and then the water solution of sodium hydroxide was added with continuous stirring. The mixture within the flask was then heated rapidly to 72° C. and maintained at that temperature during 30 minutes of continuous stirring. The benzene solution was then separated by the use of a separatory funnel and was distilled at atmospheric pressure until the temperature rose to 84° C. The remaining benzene was evaporated on a hot water bath. The liquid residue was washed with water and after drying the crystals which formed were recrystallized from isopropyl alcohol. The resultant product was identified as 2,4,6-tris(2-propynoxy)-s-triazine. The yield weighed 8 grams which was 65.8 percent of the theoretical.

*Example IV*

In the fourth example, the reactants were weighed out in the following proportions:

| | |
|---|---|
| Aniline | 13.90 gm.–0.15 mole. |
| Cyanuric chloride | 9.20 gm.–0.05 mole. |
| NaOH | 6.01 gm.–0.15 mole. |
| Benzene | 200 ml. |
| Water | 25 ml. |

The procedure in the fourth example in general followed that of the first example by the addition to the flask of the benzene solutions of aniline and cyanuric chloride to which the water solution of sodium hydroxide was added with stirring. The mixture within the flask was then heated rapidly to 74° C. and was maintained at that temperature during 30 minutes of stirring. As soon as the solution cooled, crystals began to appear. The crystals were removed by filtration and were recrystallized from a large volume of isopropyl alcohol. The resultant crystals were identified as 2-chloro-4,6-bis(N-anilino)-s-triazine with a melting point of 200° C.

*Example V*

In the fifth example the reactants were measured out in the following quantities:

| | |
|---|---|
| Allylamine | 8.60 gm.–0.15 mole. |
| Cyanuric chloride | 9.20 gm.–0.05 mole. |
| NaOH | 6.00 gm.–0.15 mole. |
| Benzene | 200 ml. |
| Water | 25 ml. |

In the fifth example, the procedure of Example I was followed, excepting that the reaction mixture was heated rapidly to 70° C. and was maintained at that temperature for 30 minutes with stirring. After 30 minutes of stirring the aqueous phase contained a white precipitate. The white precipitate was removed by filtration and was recrystallized from isopropyl alcohol. The white precipitate was determined to be 2-chloro-4,6-bis(N-allylamino)-s-triazine.

*Example VI*

The reactants in the sixth example were weighed out in the following quantities:

| | |
|---|---|
| Diallylamine | 8.73 gm.–0.09 mole. |
| Cyanuric chloride | 5.52 gm.–0.03 mole. |
| NaOH | 3.60 gm.–0.09 mole. |
| Benzene | 200 ml. |
| Water | 20 ml. |

The diallylamine and cyanuric chloride in benzene solutions were mixed in the flask as in Example I without being cooled. The sodium hydroxide in 20 milliliters of water was added to the combined benzene solutions in the flask and the resultant mixture was stirred at room temperature for an hour. The benzene solution was removed and distilled off under a pressure of 13 cm. of mercury. The product was washed with water and dried and was identified as 2-chloro-4,6-bis(N,N-diallylamino)-s-triazine.

It is to be understood that the examples that are submitted hereby are illustrative reductions to practice of the present invention and that limited modifications may be made therein without departing from the spirit and scope of the present invention as defined in the following claims.

We claim:

1. A process for the preparation of triazine derivatives by reacting a triazinyl halide in an inert organic solvent with a substituent compound containing a replaceable hydrogen atom dissolved in the same organic solvent, and in the presence of a second phase containing an acid-acceptor to accomplish the formation of the desired triazine derivative, and isolating the triazine derivative from the reactants.

2. The method of producing a triazine derivative by combining together within a flask reactive quantities of cyanuric chloride and ethylenimine in benzene solution, with a water solution of sodium hydroxide under control conditions of temperature and pressure in accomplishing the formation of the triazine derivative of which 2,4,6-tris(ethylenimino)-s-triazine is representative.

3. The process of forming a triazine derivative by combining reactive quantities of phenol and cyanuric chloride in perchloroethylene solution, with a water solution of sodium hydroxide, under temperature and pressure conditions favorable to the formation of a triazine derivative of which 2,4,6-triphenoxy-s-triazine is illustrative.

4. The process of combining within a container reactive quantities of 2-propyn-1-ol and cyanuric chloride in benzene solution in the presence of a water solution of sodium hydroxide, under conditions of temperature and pressure that result in the formation of the triazine derivative of which 2,4,6-tris(2-propynoxy)-s-triazine is illustrative.

5. The process of combining together within a container reactive quantities of aniline and cyanuric chloride in a benzene solution, which is added to a water solution of sodium hydroxide, under reactive conditions of temperature and pressure in the formation of a triazine derivative, of which an illustrative example is 2-chloro-4,6-bis-(N-anilino)-s-triazine.

6. The method of making a triazine derivative by combining within a container reactive quantities of allylamine and cyanuric chloride in benzene solution in the presence of a water solution of sodium hydroxide, and isolating the resultant product of which an illustrative example is 2-choloro-4,6-bis(N-allylamino)-s-triazine.

7. The process of making a triazine derivative by combining together in a container reactive quantities of diallylamine and cyanuric chloride in benzene solutions, and adding to the resultant solution an aqueous phase of sodium hydroxide, and isolating the resultant triazine derivative of which an illustrative example is 2-chloro-4,6-bis(N,N-diallylamino)-s-triazine.

8. The process for making 2,4,6-tris(ethylenimino)-s-triazine by mixing together about in the proportion of 9.20 grams of cyanuric chloride in about 100 milliliters of benzene with about 6.45 grams of ethylenimine in about 100 milliliters of benzene at about ice bath temperature and with stirring, adding to the mixture a solution in the proportion of about 6 grams of sodium hydroxide in 20 milliliters of water with the temperature continuously kept below about 30° C. and with stirring, increasing the temperature to about 34° C. with stirring, removing from the mixture the benzene solution, removing the benzene from the solution, isolating a filtrate from the solution, evaporating the filtrate at about room temperature, and isolating the product.

9. The process for making 2,4,6-triphenoxy-s-triazine by mixing together in the proportion of about 9.20 grams of cyanuric chloride in about 100 milliliters of perchloroethylene with about 14.10 grams of phenol in about 100 milliliters of perchloroethylene, adding to the mixed solution a solution in the proportion of about 6.00 grams of sodium hydroxide in 25 milliliters of water, heating the mixture to about 72° C. with stirring, cooling the mixture and removing crystals by filtration and evaporation of the perchloroethylene, and isolating the 2,4,6-triphenoxy-s-triazine.

10. The process for making 2,4,6-tris(2-propynoxy)-s-triazine as product by mixing together about in the proportion of 9.20 grams of cyanuric chloride in about 100 milliliters of benzene with about 8.40 grams of 2-propyn-1-ol in about 100 milliliters of benzene, adding to the mixed solution a solution about in the proportion of 6.00 grams of sodium hydroxide in 25 milliliters of water, stirring the mixture at about 72° C., removing the benzene from the mixture, and isolating the product.

11. The process for making 2-chloro-4,6-bis(N-anilino)-s-triazine as product by mixing together about in the proportion of 9.20 grams of cyanuric chloride in about 100 milliliters of benzene with about 13.90 grams of aniline in about 100 milliliters of benzene, adding to the mixed solution a solution about in the proportion of 6.01 grams of sodium hydroxide in about 25 milliliters of water, stirring the mixture at about 74° C., and isolating as product the 2-chloro-4,6-bis(N-anilino)-s-triazine so formed.

12. The process for making 2-chloro-4,6-bis(N-allylamino)-s-triazine as product by mixing together about in the proportion of 9.20 grams of cyanuric chloride in about 100 milliliters of benzene with about 8.60 grams of allylamine in about 100 milliliters of benzene, adding to the benzene solutions a solution of about 6.00 grams of sodium hydroxide in about 25 milliliters of water, and isolating as product the 2-chloro-4,6-bis(N-allylamino)-s-triazine.

13. The process for making 2-chloro-4,6-bis(N,N diallylamino)-s-triazine as product by mixing together about in the proportion of 5.52 grams of cyanuric chloride in about 100 milliliters of benzene with about 8.73 grams of diallylamine in about 100 milliliters of benzene, adding to the mixed solution about 3.60 grams of sodium hydroxide in about 20 milliliters of water, and isolating as product 2-chloro-4,6-bis(N,N diallylamino)-s-triazine.

No references cited.

WALTER A. MODANCE, *Primary Examiner.*

JOHN M. FORD, *Assistant Examiner.*